(No Model.)
S. JÖNSSON.
DEVICE FOR TRANSMITTING ROTARY MOTION.
No. 320,437. Patented June 16, 1885.
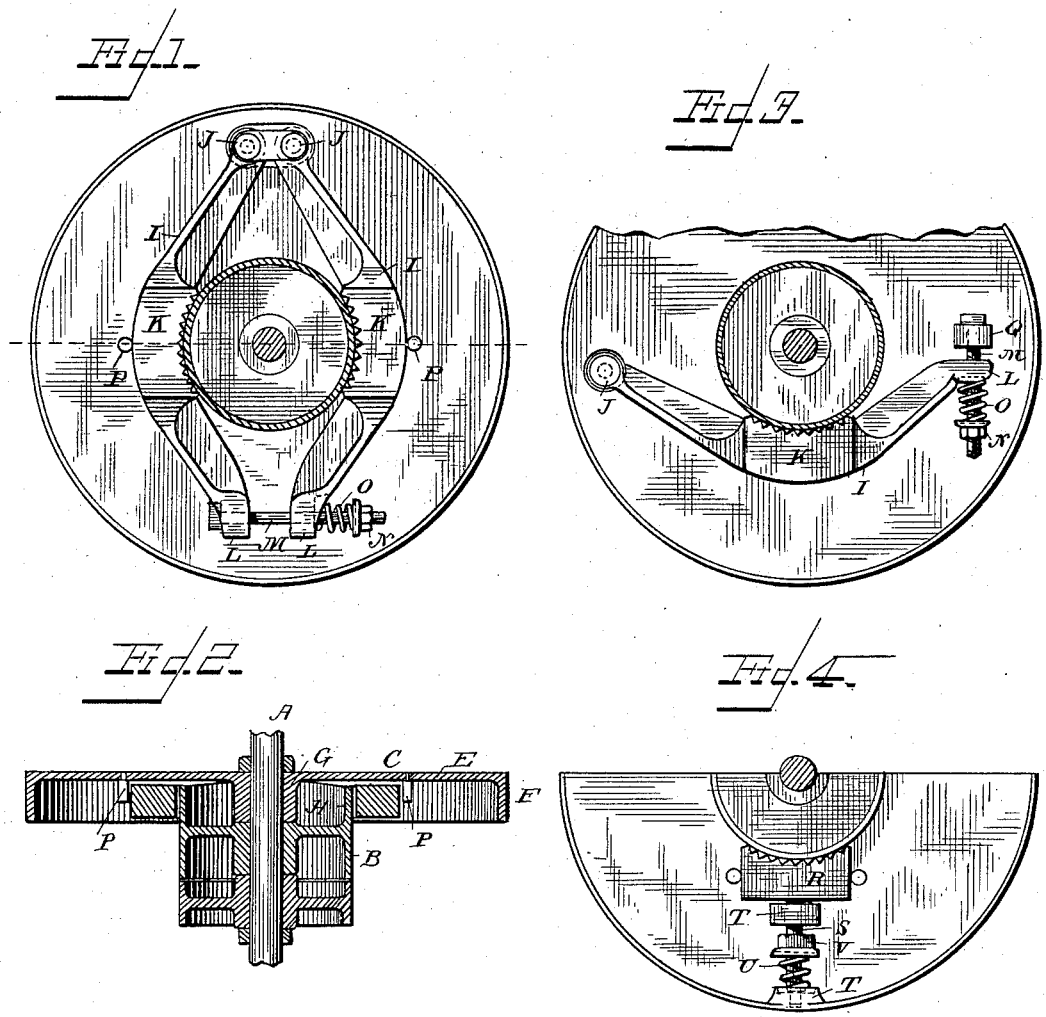
WITNESSES
F. L. Ourand
Wm. Bagger
Sven Jönsson,
INVENTOR
by Louis Bagger & Co.
Attorneys

UNITED STATES PATENT OFFICE.

SVEN JÖNSSON, OF COPENHAGEN, DENMARK, ASSIGNOR TO BURMEISTER & WAIN'S MASKIN, OG SKIBSBYGGERI, OF SAME PLACE.

DEVICE FOR TRANSMITTING ROTARY MOTION.

SPECIFICATION forming part of Letters Patent No. 320,437, dated June 16, 1885.

Application filed May 4, 1885. (No model.)

*To all whom it may concern:*

Be it known that I, SVEN JÖNSSON, a subject of the King of Denmark, residing at Copenhagen, in the Kingdom of Denmark, have invented certain new and useful Improvements in Devices for Transmitting Rotary Motion; and I do hereby declare the following to be a full, clear, and exact description of the invention, such as will enable others skilled in the art to which it appertains to make and use the same, reference being had to the accompanying drawings, which form a part of this specification, and in which—

Figure 1 is a longitudinal vertical sectional view of my improved device for transmitting rotary motion, taken on the line *x x* in Fig. 2 of the drawings. Fig. 2 is a horizontal transverse sectional view taken on the line *y y* in Fig. 1, and Figs. 3 and 4 are sectional views illustrating certain modifications of the invention.

The same letters refer to the same parts in all the figures.

This invention relates to an improved device for transmitting rotary motion; and it has for its object to so construct the same that, in case the part to which the motion is transmitted shall attain too high a rate of speed, the transmitter shall be automatically thrown out of action and be automatically restored to its operative position when the speed has been sufficiently slackened by the resistance of the parts which are being operated.

With these ends in view the invention consists in the improved construction, arrangement, and combination of parts, which will be hereinafter fully described, and particularly pointed out in the claims.

In the drawings hereto annexed, A designates a shaft, on which is fixed a wheel or pulley, B, receiving its motion from any suitable power.

C is a band-wheel mounted loosely upon the shaft A, and consisting of a disk, E, rim or flange F, and hub G, which latter is surrounded by a laterally-extending flange, H, of the pulley B.

To the inner side of the disk E of band wheel C, near the periphery of the latter, are pivoted a pair of arms, I I, either upon a common or on separate pivoting-pins, J J, which said arms are provided with curved portions K K, inclosing the flange H of the pulley B, and provided with teeth or serrations bearing against the said flange. The curved toothed portions of the said arms are increased in thickness, for the double purpose of causing the teeth to bite more effectively against the flange H and in order to give them additional weight, to increase the centrifugal power, whereby they will be thrown in an outward direction and out of engagement with the flange H of pulley B when the speed of rotation exceeds a certain limit.

The free ends of the arms I I are provided with transverse openings or eyes L L, through which passes a connecting-bolt, M, between the head or nut of which and the free end of the adjoining arm I is placed a coiled spring, O, by means of which the free ends of the said arms I I will be forced toward each other, thus causing the curved serrated portions of the said arms to grasp the flange H of pulley B with a degree of tension which may be regulated by loosening or tightening the nut N of the bolt M as occasion may demand.

In order to prevent either one of the arms I from moving outwardly suddenly by centrifugal force, and thereby so straining the spring O as to prevent the release of the other arm I from its bite upon the flange H of pulley B, I provide the disk E of the band wheel with a pair of stop-studs, P P, located so closely to the arms I I that the latter may swing in an outward direction merely sufficiently to bring their serrated edges out of contact with the flange H of pulley B.

The operation of this invention will be readily understood from the foregoing description, taken in connection with the drawings hereto annexed. Power being applied to the pulley B, the latter will, through the arms I I, impart a rotary motion to the band-wheel C, from whence it is transmitted to the machinery to be driven. When the speed exceeds a given rate, which is regulated by the tension of the spring O, the arms I I will by the centrifugal force thus exerted be caused to release their hold upon the flange H of pulley B, thus disconnecting said pulley from the band-wheel until the speed of the latter, by the resistance of the machinery driven thereby, is so slackened as to enable the tension of the spring O to overcome the centrifugal force, when the arms I I will again be brought into contact with the flange H, and the operation will proceed as before.

It is obvious that this device may be subjected to numerous structural changes without departing from the spirit of the invention. Thus, as will be seen in Fig. 3 of the drawings, a single arm I may be employed in lieu of a pair, one end of the bolt M being in such case arranged in a transversely perforated lug, Q, upon the inner side of the disk E of the band-wheel C; or, as shown in Fig. 4, the arms I I may be omitted, and replaced by a block, R, or a series of two or more such blocks, having concave serrated inner sides or edges adapted to bear against the flange H, and provided with screw-threaded stems S, arranged to slide radially in suitable guide-studs, T, upon the disk E. A spring, U, is arranged upon the stem S between the outer bearing, T, and a nut, V, adjustable upon the said stem, and by means of which the tension of the spring may be regulated.

The operation of this device will be obvious when reference is had to the foregoing description.

I would have it understood that I reserve to myself the right to these and to all other modifications which may be resorted to without departing from the spirit of my invention.

Having thus described my invention, I claim and desire to secure by Letters Patent of the United States—

1. A device for the transmission of rotary motion, consisting of friction devices arranged to engage a flanged pulley until the speed of rotation exceeds a certain limit, when, by the centrifugal action thus produced, they shall be thrown out of engagement, substantially as herein described, for the purpose shown and specified.

2. In a device for transmitting rotary motion, the combination of a fixed pulley, a loose band-wheel adjoining the same, friction devices pivoted or arranged to slide radially upon the side of the band-wheel adjoining the pulley, and adapted to engage the latter, or a flange extending laterally therefrom, a spring or springs arranged to force the said friction devices into contact with the pulley or its flange, and means for regulating the tension of the said spring or springs, substantially as and for the purpose herein set forth.

3. In a device for transmitting rotary motion, the combination, with a shaft, of a fixed pulley, a loose band-wheel adjoining the same, a pair of arms pivoted to the said band-wheel and adapted to bear against the sides of the said pulley, a bolt connecting the free ends of the said arms, and a spring arranged between the free end of one of said arms and the head or nut of the said bolt, substantially as and for the purpose set forth.

4. In a device for transmitting rotary motion, the combination, with a shaft, of a fixed pulley, a loose band-wheel adjoining the same, a pair of arms pivoted to the said band-wheel, and having concave, thickened, or re-enforced serrated portions adapted to bear against the said pulley, and a spring or springs arranged to force the said arms into contact with the said pulley, substantially as and for the purpose set forth.

5. In a device for transmitting rotary motion, a loose band-wheel having a pair of pivoted arms adapted to bear frictionally against the sides of a fixed pulley adjoining the said band-wheel, a spring mounted upon a bolt connecting the free ends of the said arms between one of said arms and the head or nut of said bolt, and acting to force the said arms into frictional contact with the pulley, and stop-studs arranged upon the face of the band-wheel to prevent the outward movement of the pivoted arms more than sufficiently to release their bite upon the pulley when the centrifugal power acting upon the said arms shall overcome the tension of the spring, substantially as and for the purpose herein set forth.

In testimony whereof I have signed my name to this specification in the presence of two subscribing witnesses.

SVEN JÖNSSON.

Witnesses:
FREDERIK WOLFF,
EMIL HANSEN.